United States Patent [19]

Bresciani et al.

[11] Patent Number: 4,624,729
[45] Date of Patent: Nov. 25, 1986

[54] MACHINE FOR CONTINUOUSLY ETCHING A SURFACE OF GLASS SHEETS

[75] Inventors: Ferruccio Bresciani, Mariano Comense; Pietro Santambrogio, Seregno, both of Italy

[73] Assignee: Vitreal Specchi S.p.A., Mariano Comense, Italy

[21] Appl. No.: 788,045

[22] Filed: Oct. 16, 1985

[30] Foreign Application Priority Data

Oct. 30, 1984 [IT] Italy .................. 23374 A/84

[51] Int. Cl.[4] .................. B44C 1/22; C03C 15/00; C03C 25/06
[52] U.S. Cl. .................. 156/345; 65/31; 156/637; 156/654; 156/663
[58] Field of Search .............. 156/345, 663, 637, 654; 65/31; 134/64 R

[56] References Cited

U.S. PATENT DOCUMENTS 3,284,181 11/1966 Harrell et al. .................. 156/663 X
3,294,603 12/1966 Myers .................. 156/663
4,427,488 1/1984 Servais et al. .................. 156/663

*Primary Examiner*—William A. Powell

[57] ABSTRACT

A machine is described that enables to perform continuous etching, according to previously chosen patterns, on a face of glass sheets, in particular of big size. This machine having a high productivity per hour, substantially comprises a roller conveyor formed of a plurality of parallel rollers, all of them having the same diameter, and being driven for feeding forward glass sheets with one face lying on the plane surface defined by the upper generating lines of the rollers, tangentially thereto. The rollers not only feed forward the glass sheet with a controlled speed, but also wet the sheet surface to be etched in an even manner, as they are provided with a spongy outer surface being continuously steeped, during the rotation, in an acid solution which is contained in a lower reservoir and then is transferred by contact to the lower face of the sheet. A chain drive system ensures a uniform speed of all the rollers in function of a selected time of contact provided for each glass sheet with the rollers soaked of acid. There are also provided means for settling the liquid and means for maintaining the acid volume, as well as sucking means for the removal from the environment of vapors generated during the etching.

5 Claims, 3 Drawing Figures

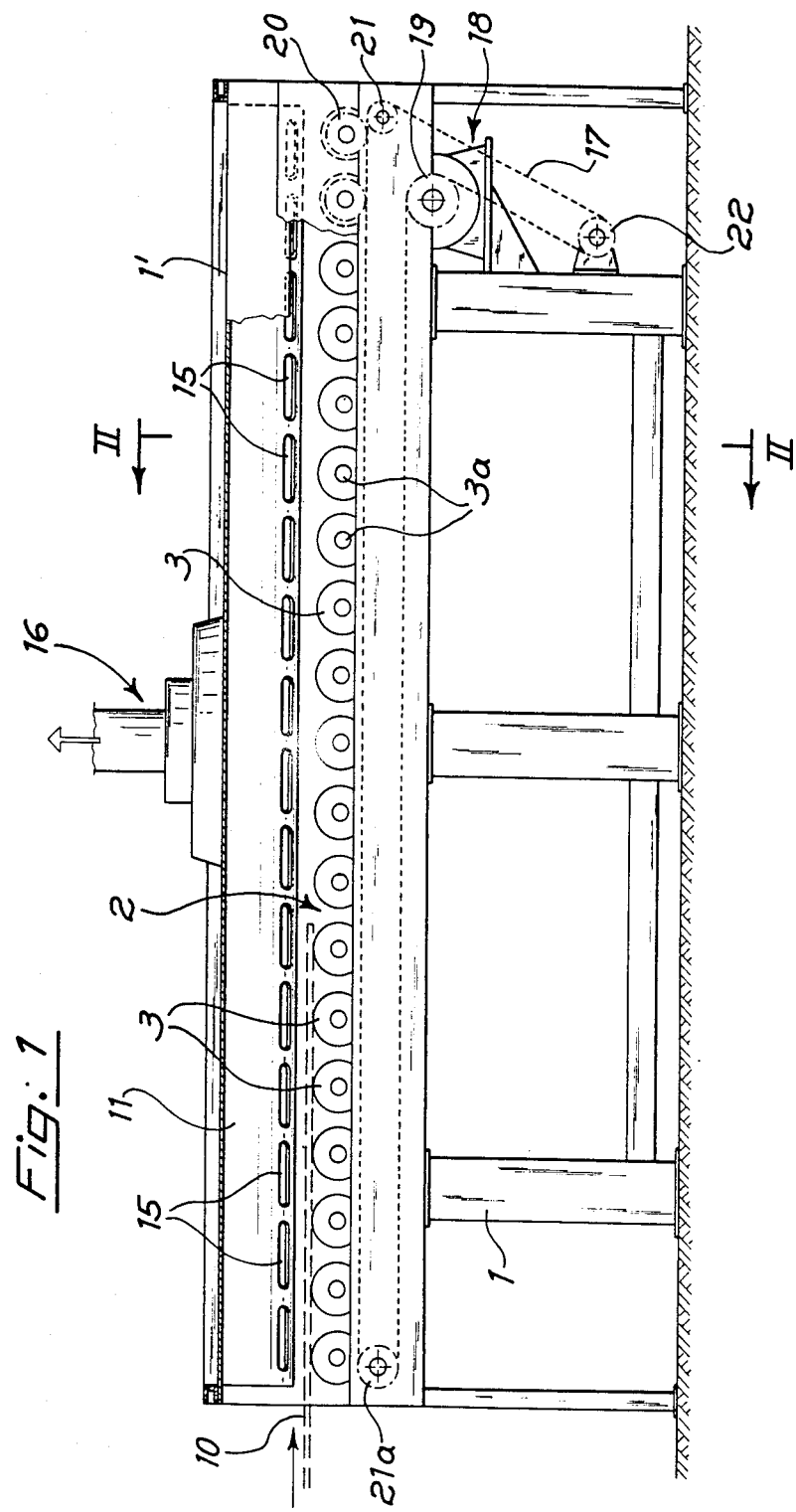

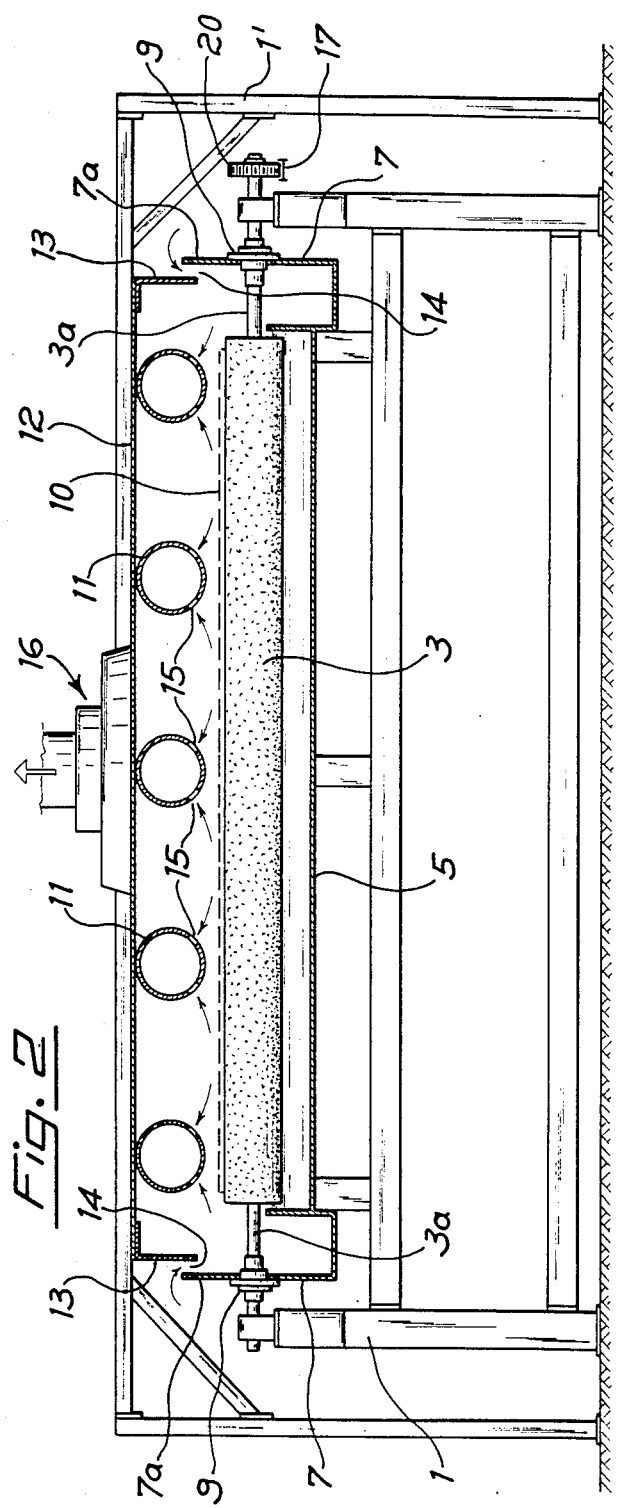
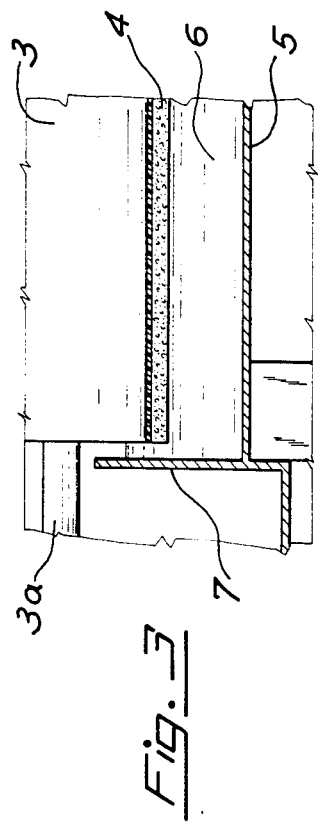

MACHINE FOR CONTINUOUSLY ETCHING A SURFACE OF GLASS SHEETS

BACKGROUND OF THE INVENTION

The present invention is directed to a machine for continuously etching a surface of glass sheets, especially of big size, according to previously chosen patterns, by means of acid solutions.

It is known to use acids, in particular solutions of HF, in order to obtain glass sheets decorated with etchings on at least one face, by providing thereon a matrix of protective lacquer covering those areas which should not be attacked by the acid so as to form the negative of the pattern to be performed. When the glass sheets are of big size, considerable difficulties are met to put into contact with the acid all the points of the surface to be treated. The difficulties are especially due to the dangerous vapours issued, the important volumes of acid required and the scarce handiness of the sheets.

It is known that these inconveniences were already overcome by the previous Italian Pat. No. 817409 in the name of the present Assignee, but the apparatus forming its object however showed the disadvantage of enabling the treatment with acid in a discontinuous manner only, i.e. a glass sheet each time, as well as of having fixed sizes, which required the necessary availability of a number of equipments in order to be able to treat a plurality of glass sheet at the same time and/or of different size. This prior art apparatus, besides having a low productivity per hour, also required a large-scale employment of labour, with consequent high costs.

SUMMARY OF THE INVENTION

It is an object of the present invention to provide an apparatus enabling the continuous production of acid-etched glass sheets, which is thus capable of having a production per hour much greater than the prior art equipments, without particular limitations of size, while being kept within the maximum sizes of the glass sheets and with a reduced labour employment.

These results are obtained with a machine comprising a plurality of cylindrical rollers, all having the same diameter, with the horizontal axes parallel one another, coplanar and spaced apart preferably of the same distance, all being driven so as to rotate at the same adjustable speed for the feed of a glass sheet lying on a plane defined by the upper generating lines of said rollers. The outer surface of the rollers is made of a preferably spongy material, such as rubber-based, which is steeped or wetted in an acid solution contained in a lower reservoir and is adapted to transfer by contact a thin layer thereof onto the lower face of the glass sheet being conveyed. There are also provided settling means of the liquid and means for maintaining the acid value, as well as sucking means for the vapours generated during etching.

With the machine according to the invention the time of contact can be easily selected by properly adjusting the speed of sheets feeding, i.e. the rotation of rollers, in consequence of the roller path length along which the treatment is accomplished and of the desired etching depth. As a matter of fact, in order to have a chosen etching depth, the technician will determine the contact time required and thereafter, as the path length is fixed, will properly adjust the rotation speed of the rollers. Of course an apparatus of modular construction could also be provided, with which it is possible to vary the path length of the roller conveyor. Furthermore the multiplicity of the rollers provides a uniform distribution and a continuous renewal of the corrosive acid put by them into contact with the sheet surface to be etched.

Equally spaced apart rollers will be preferably used, both for a better constructional convenience, and for an evener distribution of the acid.

It is evident that the apparatus according to the present invention provides for a continuous treatment of glass sheets, since as soon as a sheet has started its treatment path, immediately thereafter a subsequent sheet is fed, which undergoes the same treatment on the lower face, thus avoiding any downtime as on the contrary was experienced with the prior etching methods.

BRIEF DESCRIPTION OF THE DRAWINGS

Further advantages, objects and features of the machine according to the present invention will be better understood from the following detailed description of an embodiment thereof, given by way of non-limiting example, with reference to the accompanying drawings, wherein:

FIG. 1 shows a diagrammatic side view, partially sectioned, of the machine according to the invention;

FIG. 2 shows a cross-section view taken along line II—II of FIG. 1; and

FIG. 3 shows a detail of FIG. 2 at an enlarged scale.

DETAILED DESCRIPTION OF THE PREFERRED EMBODIMENT

With reference to the drawings, the machine of the invention comprises, on a support frame 1 and within a protection and cover housing 1', a roller conveyor path 2 comprising a plurality of rollers 3 having the same diameter and length, each roller being positioned one behind another with their shafts 3a being horizontal and all mutually parallel, preferably equally spaced apart.

With reference to FIG. 2, each roller 3 is provided on the whole outer surface with a layer of spongy material 4 or anyhow such as to be soaked or wetted, if dipped in a liquid, on which a glass sheet rests to be conveyed in the forward direction of the rollers, denoted by arrow F. The length of each roller will be at least equal to the maximum width of the sheet to be subjected to the treatment and obviously ensures the contact also with narrower sheets, whereas the length of the roller conveyor 2 depends, as discussed above, on the feeding speed and the time of contact with the acid which is intended to be provided at each point of the sheet. A machine of this type allows for treatment of sheets of whichever length, as the time of contact does not depend on the sheet length, but on the roller path length.

The contact between the face of the sheet 10 to be treated, or better between each point not covered with protective lacquer and the acid solution contained in a single reservoir 5, either extending immediately under the roller conveyor 2 or formed of a number of small reservoirs equal to the number of rollers, is accomplished by transfer of the liquid 6 in the reservoir 5 through the spongy material 4 which soaks up, as it is partially or completely immersed therein and, upon rotation of roller 3, delivers the liquid to the lower face of the sheet 10 with which it is in contact. Liquid 6, which normally is a solution of hydrofluoric acid, is usually fed into the reservoir 5 continuously, through pipes (not shown) and its level is kept constant at a height as that shown in the drawings, better seen in FIG. 3, by means of known overflow devices, also not represented.

Two safety tanks 7 are provided, one at each side of the reservoir 5, with the aim of receiving therein possible jets of liquid 6 which could be ejected from the reservoir 5, thus preventing their contact with machine portions. However it should be appreciated that all portions of the machine which are susceptible of coming into contact with the aqueous solution are made of or at least coated with PVC, or another similar anti-corrosive material, above all the walls of reservoir 5. At both ends the shaft 3a of each roller 3 is rotatably mounted on liquid-tight bearings 9, also coated with an anti-corrosive material. Systems for liquid settling and for maintaining its acid value are also provided (not shown), preferably of the automated type, by means of a device for continuously detecting the acidity, which controls electric pumps to deliver water or acid respectively until the desired value is obtained in fuction of the difference between the detected value and a reference value.

The problem of the corrosive and damageous vapours generated during the etching has been solved according to the invention by means of a plurality of conduits 11 (in FIG. 2 they have been represented in number of five, but obviously their number could be different) all positioned mutually parallel in the longitudinal feed direction of the sheet 10, so as to extend themselves along the length of the roller path. As seen in FIG. 2 the conduits are positioned side by side, all at the same height, equally spaced apart, such as to uniformly divide into influence zones, associated with each conduit, the whole space comprised between the glass sheet 10 on the roller conveyor 2 and a hood defined by an upper covering member 12, in PVC, integral to the outer housing 1', as well as by two L-shaped sections 13, also extending longitudinally throughout the length of the roller path 2, and so arranged as each of them defines an air intake zone 14 in co-operation with an associate vertical extension 7a of the outer wall of the lateral tank 7.

The conduits 11, provided with perforated portions 15, are in communicatin with a not shown suction source through a manifold 16. The vacuum thus generated within each conduit 11 draws ambient air therein through the perforations 15 and, through the passageways 14, from the outside towards the volume circumscribed by the above-defined "hood". Thereby air streams are produced as indicated with arrows in FIG. 2, which carry along with them all the vapours and fumes emitted during the acid treatment of the glass sheet, then finally conveyed to a station of known type, where the vapours are collected and eliminated.

With reference to the driving of rollers, each of them is powered, as it is linked to a single geared motor 18, such as a d.c. variable-speed motor, by means of a drive, preferably a chain drive, as shown, or also a worm screw-helical gear unit. In the illustrated arrangement the motor 18 moves a chain 11 by means of pinions 19, 20, transmission sprocket wheels 21, 21a and an idler 22. Thus the same peripheral speed is provided for all the rollers 3 and the glass sheet 10 is prevented from slipping or uneven forward movement of the rollers.

Possible additions and/or variations will be carried out by those skilled in the art, in connection with the above described and illustrated embodiment of the machine according to the invention, without therefor exceeding the scope of the invention itself. In particular there could be provided different means to keep constant the level of acid solution in the reservoir 5, as well as for the synchronized transmission of movement to the rollers, on condition that these have the same peripheral speed.

What we claim is:

1. A machine for continuously etching a face of glass sheets comprising a roller path conveyor with a plurality of cylindrical rollers, all having the same diameter and length, horizontal axes which are mutually parallel and co-planar, and all of them being driven so as to rotate at one selected adjustable speed for the feed of a glass sheet lying on a plane defined by the upper generating lines of said rollers, the outer surface of which rollers is provided with a layer of a material capable of being wet in an acid solution contained in a lower reservoir and of transferring the same solution by contact onto the lower face of the glass sheet conveyed, there being further provided suction means for sucking vapours generated in a hood space defined over the glass sheet, as well as motor and drive means for rotating all the rollers at the same peripheral speed.

2. A machine according to claim 1, wherein there is further provided means for continuously feeding said acid solution into the reservoir and keeping therein a constant level, such as to ensure that said layer of material is at least partially dipped in said solution.

3. A machine according to claim 1, wherein said layer of material is of a spongy, rubber-based nature.

4. A machine according to claim 1, wherein said motor means and drive means are respectively a d.c. variable-speed motor and a drive chain linking all the horizontal axes of the rollers together through pinions, sprocket wheels and at least one idler.

5. A machine according to claim 1, wherein said suction means comprises a plurality of conduits, all positioned mutually parallel in the longitudinal direction of the roller path conveyor, extending along the whole length thereof and provided with through holes, each conduit being communicated with a suction source by means of a common manifold, all defining a plane over the roller path within a hood space circumscribed by the glass sheet to be etched and by an upper wall and side walls which keep free a longitudianl opening for the air inlet from outside.

* * * * *